United States Patent [19]

Siol et al.

[11] Patent Number: 5,141,993

[45] Date of Patent: Aug. 25, 1992

[54] COMPATIBLE BLENDS OF POLYOXYMETHYLENE AND POLYALKYL ACRYLATES

[75] Inventors: Werner Siol, Darmstadt; Klaus Frank, Muhltal; Ulrich Terbrack, Reinheim, all of Fed. Rep. of Germany

[73] Assignee: Rohm GMBH Chemische Fabrik, Darmstadt, Fed. Rep. of Germany

[21] Appl. No.: 701,003

[22] Filed: May 13, 1991

Related U.S. Application Data

[63] Continuation of Ser. No. 310,387, Feb. 15, 1989, abandoned.

[30] Foreign Application Priority Data

Feb. 18, 1988 [DE] Fed. Rep. of Germany ....... 3805052

[51] Int. Cl.⁵ ............... C08L 59/02; C08L 59/04; C08L 33/08
[52] U.S. Cl. ............... 525/154; 525/400; 525/401
[58] Field of Search ............... 525/154, 401

[56] References Cited

U.S. PATENT DOCUMENTS

3,081,280  3/1963  Carlson ............... 260/45.85

FOREIGN PATENT DOCUMENTS

| | | |
|---|---|---|
| 1931392 | 1/1971 | European Pat. Off. . |
| 1595282 | 8/1981 | European Pat. Off. . |
| 0115373 | 8/1984 | European Pat. Off. . |
| 124879 | 11/1984 | European Pat. Off. . |
| 164667 | 12/1985 | European Pat. Off. . |
| 181541 | 5/1986 | European Pat. Off. . |
| 0181541 | 5/1986 | European Pat. Off. . |
| 2420300 | 12/1975 | Fed. Rep. of Germany . |
| 2659357 | 7/1978 | Fed. Rep. of Germany . |
| 2709037 | 9/1978 | Fed. Rep. of Germany . |
| 3441547 | 5/1986 | Fed. Rep. of Germany . |
| 60-108413 | 6/1985 | Japan . |
| 1590549 | 6/1981 | United Kingdom . |

OTHER PUBLICATIONS

Patent Abstracts of Japan, Band 5, No. 79 (C-56) (751), May 23, 1981 and Japanese A56 28236, Asahi Kasei Kogyo, Mar. 19, 1981.

*Primary Examiner*—James J. Seidleck
*Assistant Examiner*—Vasu S. Jagannathan
*Attorney, Agent, or Firm*—Oblon, Spivak, McClelland, Maier & Neustadt

[57] ABSTRACT

A compatible polymer blend consisting essentially of:
a) 0.5-99.5 wt. % of homopolymer or copolymer polyoxymethylene component, and
b) 99.5-0.5 wt. % of a polymer component which comprises 40-100% of at least one monomer of formula $$CH_2=CH-\overset{\overset{\displaystyle O}{\|}}{C}-OR_1 \qquad I$$

in which $R_1$ is methyl or ethyl. The blends are suitable for use as engineering plastics.

12 Claims, No Drawings

COMPATIBLE BLENDS OF POLYOXYMETHYLENE AND POLYALKYL ACRYLATES

This application is a continuation of application Ser. No. 07/310,387, filed on Feb. 15, 1989, now abandoned.

BACKGROUND OF THE INVENTION

1. Field of the Invention

This invention concerns compatible blends (polyblends) consisting of polyoxymethylene and polyalkyl acrylates.

2. Discussion of the Background

Different polymeric species are generally considered not to be compatible with one another, i.e., different polymeric species do not generally develop any homogeneous phase down to small proportions of one component in a second component that would be characterized by complete miscibility of the components. Certain exceptions to this rule have brought about increasing interest, especially among those concerned with the theoretical interpretation of the phenomena.

Completely compatible blends of polymers show complete solubility (miscibility) in all blend ratios. The glass transition temperature Tg or the so-called "optical method" (clarity of a film cast from a homogeneous solution of the polymer blend) have frequently been used to prove miscibility. (See Brandrup-Immergut, Polymer Handbook, 2nd Ed., III-211-213; Kirk-Othmer, Encyclopedia of Chemical Technology, 3rd Ed. Vol. 18, 443-478, J. Wiley & Sons 1982).

Thus, for example, a blend of polyethylene oxide with polyacrylic acid shows a higher Tg with a low polyethylene oxide content than either of the two components themselves. (See K. L. Smith, A. E. Winslow & D. E. Petersen, Ind. Eng. Chem. 51, 1361 (1959)).

Polyoxymethylene (POM), because of its desirable mechanical properties (hardness, rigidity, toughness, down to low temperatures) and its resistance to solvents, has found a firm position among engineering materials. Thus, about 190,000 tons of POM was already consumed worldwide in 1983. (See R. Vieweg, M. Reiher, H. Scheurlen, Ed., Plastics Manual Vol. 11, Carl Hanser Verlag Munich 1971; G. E. Haddeland in Process Economics Program Report No. 69, Acetal Resins, Stanford Research Institute, Menlo Park, USA (1971); Kirk-Othmer, Encyclopedia of Chemical Technology 3rd Ed. Vol 1, pp. 112-123, J. Wiley 1978; Winnacker-Kuchler, Chemische Technologie Vol. 6, Org. Technologie II, 4th Edition, Carl Hanser, Munich 1982).

The literature provides a number of examples of mixtures of polyoxymethylene with other plastics, apparently in the pursuit of various technological objectives, but without true compatibility of the components being intended or even achieved. Thus, DE-A 27 09 037 describes a coating paste for missile propellant charges that was obtained from a solution of POM, polymethyl methacrylate (PMMA), and paraformaldehyde in toluene. (See Chem. Abstr. 90:206 733h). The ability of the POM to form crystalline fibers has been utilized variously to produce fiber-reinforced plastics, including those based on PMMA (See Chem. Abstr. 83:148376m; Chem. Abstr. 87:85985u).

Attempts have been made to improve the impact strength of POM by mixing with elastomers, for example acrylonitrile-grafted ethylene-propylene rubber (Chem. Abstr. 99:176894c) or MMA-grafted polybutadiene (See DE-A 3 441 547), or butadiene-MMA block copolymers (DE-A 24 20 300) or butadiene-styrene or acrylonitrile-butadiene-styrene graft copolymers (DE-A 19 31 392). Other impact strength modifications are acrylonitrile/styrene-grafted or styrene-grafted polyoxymethylene (DE-A 26 59 357). The preparation of high-impact strength POM by polymerization of trioxane in the presence of an elastomer such as an ethylene-propylene-2-hydroxyethyl methacrylate copolymer is recommended in JP-A 60/108413 (Chem. Abstr. 104: 6621r) (See; also Chem. Abstr. 103: 19692v). EP-A 115 373 recommends the addition of a multiple-phase crosslinked copolymer to POM mixtures with an alkyl $C_{10-30}$ fatty acid $C_{2-7}$ ester and polymers such as caprolactam-caprolactone copolymers or polybutyl methacrylate, which are compatible with the fatty acid ester and are inert to POM.

The special tendency of POM toward crystallization, which in the last analysis also amounts to the high mechanical strength and the good resistance to solvents, as well as the fact that the material tends to decompose by splitting off formaldehyde (ceiling temperature: 127° C.) even 50° C. above the crystallite melting point (m.p.: 175°-184° C.), of course permits only a very narrow processing range, so that up to this time, approximately 90% of the overall consumption of POM is in the field of injection molding, since subsequent forming of panels, for example, by deep-drawing or the like is possible only with difficulty because of the very narrow processing range of this material. On the whole, the homopolymers and copolymers of the POM type are considered to be unstable to heat and oxygen, so that they can be processed only after the addition of suitable stabilizers. (See H. Batzer Ed., Polymere Werkstoffe, Volume III, Technologie 2, pp. 144-148 ff; Volume II, pp. 375-376, Georg Thieme Verlag, Stuttgart, New York 1984; U.S. Pat. No. 3,081,280). Since the decomposition of polyoxymethylene proceeds from the chain ends containing hydroxy groups, practically all commercial grades of POM are stabilized by terminal esterification or etherification. Under the conditions of use in practice, of course, this stabilization is inadequate since, for example, under the action of the formic acid (formed from the split-off formaldehyde), polymeric fragments are again formed with thermolabilizing terminal hydroxy groups. For this reason, aldehyde-binding and acid-binding additives such as urea-melamine derivatives, hydrazine derivatives, and polymer-compatible copolyamides (such as a PA-6/PA-66 copolyamide) are usually added, together with antioxidants (See H. Batzer, loc.cit. Vol. II, pp. 375 376). Therefore, the problems in processing POM are appropriately characterized by the statement: "that the POM consumption of a country depends on its degree of industrialization" (H-D Sabel, Kunststoffe 70, 641 (1980)). It has therefore been necessary to direct the efforts of technology toward improving POM by modifying its processability and manageability in the form of its homopolymers and copolymers, if possible without negatively affecting its beneficial characteristics.

SUMMARY OF THE INVENTION

Accordingly, one object of the present invention is to provide compatible polymer blends of polyoxymethylene homopolymers and copolymers with polyacrylates which have improved processability and stability and yet maintain the desirable POM physical characteristics.

These and other objects which will become apparent from the following specification have been achieved by the present compatible polymer blends. It has now been found that miscible polyblends can be produced, using polyacrylate polymers which are compatible with POM homopolymers and copolymers. These polymers can be blended with POM in the melt, for example, to form glass-clear blends.

DETAILED DESCRIPTION OF THE PREFERRED EMBODIMENTS

This invention thus concerns compatible polymer blends based on polyoxymethylene homopolymers and copolymers, with these blends containing:

a) 0.5–99.5, particularly 60–99.5, especially 80–99 wt. % of a polyoxymethylene component, and b) 99.5–0.5, particularly 40–0.5, especially 20–1 wt. % of a polymer Pl component that is made up of 40–100 wt. % of at least one monomer of Formula I $$CH_2=CH-\overset{O}{\underset{\|}{C}}-OR_1 \qquad I$$

in which $R_1$ stands for methyl or ethyl.

In general, the sum of a) and b) should add up to 100 wt. %.

Experience indicates that particularly good compatibility of POM with the polymer Pl is present when the polymer Pl is made up of at least 60 wt. % and preferably of at least 80 wt. % of the monomer of Formula I. For example, POM and polymethyl acrylate ($R_1=CH_3$) prove to be compatible with one another over the entire blend ratio studied of 0.5 to 99.5 wt. % POM and the corresponding 99.5 to 0.5 wt. % polymethyl acrylate.

When the polymers Pl are not polymers formed exclusively from monomers of Formula I, other monomers copolymerizable with the monomers of Formula I can be present in the structure of the polymers Pl, in proportions of 0–60 wt. %, preferably at least 1 wt. %. In general, the fraction of additional monomers lies in the range of 1–20 wt. % based on polymer Pl.

These monomers preferably have Formula II $$\underset{\underset{R_2}{\overset{|}{C}}}{CH_2=C-R_2} \qquad II$$

in which R stands for hydrogen or methyl, and $R_2$ stands for phenyl, or for a $$-\overset{O}{\underset{\|}{C}}-OR_3$$

group, in which $R_3$ stands for an alkyl group with 1–14 carbon atoms, provided that R does not stand for hydrogen and $R_1$ and $R_3$ for methyl at the same time.

Examples of blends formed from POM and a polymer Pl are those consisting of 93 parts by weight of methyl acrylate and 7 parts by weight of styrene, or a polymer Pl formed from 90 parts by weight of ethyl acrylate and 10 parts by weight of 2-ethylhexyl methacrylate.

The polymer blends of the present invention, by definition, are compatible polymer blends (polyblends).

The following should be considered as criteria for compatibility, in conformity with standard texts:

I) Observation of the glass transition temperature Tg.

If the polymer components have glass temperatures that are far enough apart to be differentiated by "differential scanning calorimetry" (DSC), dilatometrically, dielectrically, or by radioluminescence spectroscopy, compatibility is indicated by a shift or by the disappearance of the Tg of the individual polymer components. (See Olabisi et al. in Polymer-Polymer Miscibility, loc. cit. pp. 21, 123).

II) The "optical method".

A film is cast from a homogeneous solution of the polymeric components, which must show no optically detectable lack of homogeneity after drying, even with magnification.

In the present case, proof of compatibility by method I and particularly by method II presents difficulties, since polyoxymethylene crystallizes very well and thus is generally not transparent. The compatibility of POM with the polymers Pl can best be demonstrated in the melt. Thus, the polymers Pl generally produce a glass-clear (=compatible) melt with POM.

The polyoxymethylene components a)

In the context of this invention, polyoxymethylene (POM) means the polymers discussed above which are made up primarily of $-(CH_2-O)-$ units, i.e., the homopolymers or copolymers ordinarily included in the term POM, particularly in the stabilized forms, and especially the commercially available forms. It is well known that POM homopolymers, for example, can be made by anionic polymerization of formaldehyde, for example in suspension followed by end group stabilization, with trialkylamines or alkali metal alkoxides being used as initiators. Stabilization can be carried out, for example, by acylation or etherification of the terminal hemiacetal OH groups, for example with acid anhydrides such as acetic anhydride, or with epoxides such as ethylene oxide.

Copolymers of the POM type, for example, can be obtained by cationic suspension polymerization, starting from formaldehyde or trioxane, for example, with Lewis acids such as $BF_3$ or $HClO_4$. Examples of copolymerization components that can be used for POM are ethylene oxide, dioxolane, or butanediol formal (content by weight approximately 2–4%). An aliphatic or cycloaliphatic hydrocarbon is generally used as the suspension medium. The average molecular weight (number average) is generally in the range between $\overline{Mn}=20,000$ and $\overline{Mn}=100,000$, and the nonuniformity $\overline{Mw}/\overline{Mn}$ is generally about 2. The homopolymers have a higher degree of crystallization (up to 90%) and thus somewhat greater hardness, rigidity, and strength than the copolymers. The modulus of elasticity of the homopolymer is approximately 2,800 MPa, and that of the copolymer is approximately 3,200 MPa.

Polyoxymethylene dissolves, for example, in hexafluoroacetone sesquihydrate, and at higher temperatures in m-cresol. As is generally customary, it is advantageous to use polyoxymethylenes stabilized in the manner indicated above. The polymer blends in practical application can also use known additives such as plasticizers, lubricants, dyes and pigments, fillers, and other stabilizers in the usual amounts, i.e., generally less than 20 wt. % based on the polymer blends. (See R. Gachter and H. Muller, Taschenbuch der Kunstoffe-Additive, Carl Hanser Verlag).

Examples of commercial POM products are the types of DELRIN 500 F ® or 900 F ® of the DuPont Co.

The acrylate polymer components b)

The polymers Pl made up of the monomers of Formula I and optionally other monomers, preferably of Formula II, can be produced by the known polymerization processes, preferably radical polymerization, for example by emulsion, bead, solution, or bulk polymerization. (See Kirk-Othmer, Encyclopedia of Chemical Technology 3rd Ed. Vol. 1 pp. 330-342, Vol. 18, pp. 720-755, J. Wiley; H. Rauch-Puntigam, Th. Volker, Acryl- und Methacrylverbindungen). Initiators ordinarily used are the known radical initiators such as peroxy compounds and azo compounds, depending on the monomers and the type of polymerization, with the amounts of initiator generally being in the range of 0.001 to 0.5 wt. % based on the monomers.

Examples of useful initiators are persulfates or optionally redox systems for emulsion polymerization, both peroxides such as dibenzoyl peroxide or dilauroyl peroxide, and azo compounds such as azobisisobutyronitrile for bulk polymerization, and also for solution polymerization or bead polymerization.

The customary regulators, particularly the known sulfur regulators, for example from the group of mercaptans such as dodecyl mercaptan, can be used to regulate the molecular weight.

The polymerization is usually carried out at elevated temperature, for example above 50° C. The conventional equipment is used, for example, conventional reactors. The molecular weight of the polymers Pl is not limiting, but polymers in the molecular weight range of 2,000 to 5,000,000, preferably 20,000 to 3,000,000, are generally used for the acrylate polymer components b). (Determined by light scattering: concerning determination of molecular weights, see Houben-Weyl, Methoden der Org. Chemie, 4th Edition Vol. 14/1 Georg Thieme-Verlag Stuttgart 1961). The molecular weight chosen is governed by the application (see below).

Preparation of the Blends

The compatible blends can be made by different procedures. For example, they are produced by intensive mechanical mixing of the components a) and b) in the melt, in an extruder, etc. Similarly, the polymer blend can be produced by coprecipitation. In principle, there are no limits to the method of blending. As a rule, blends of the components a) and b) are first produced, preferably starting with solids in the form of a bead polymer, for example, or a granulate, using slow mixers such as drum mixers, tumblers, or double-chamber plow blade mixers. The slow mixing units cause mechanical mixing without eliminating the phase boundaries. (See Ullmann's Encyklopadie der Technischen Chemie, 4th Edition, Vol. 2, pp. 282-311, Verlag Chemie). The thermoplastic treatment is then carried out by homogeneous mixing in the melt, using heated mixers at suitable temperatures, for example 150° C. to approximately 200° C., in kneaders or extruders, for example, single or multiple-screw extruders, or optionally in extruders with oscillating screws and shear pins (for example, in a BUSSCO kneader).

Granulates of uniform particle size (for example, hot cutoff, cubic, round grain) can be produced by these processes. The grain size of the granulates is in the range of 2 to 5 mm. Another, simple method for producing the polymeric blends is mixing POM with spray-dried polymer dispersions containing polymer component Pl.

The compatible polymer blends pursuant to the invention consisting of POM and the polymers Pl are suitable for the areas of use in which POM has already been used, for example as engineering plastics in equipment construction, as precision parts in precision mechanics, as installation materials, etc. As mentioned previously, polymer blends that contain 80-99.5 wt. % POM and 20-0.5 wt. % polymer Pl are of particular interest. Even these small added quantities of polymer Pl, as a processing aid for POM, produce a distinct modification of the POM melt and improve the transition that is otherwise difficult to handle (crystallite melting point of POM at about 184° C., processing of the very low viscosity melt at 190° C.).

Thus, POM can be handled more readily in extrusion, in blow-molding, and in thermoforming by adding polymer Pl. The preparation of high-temperature-resistant foams from POM can also be made possible by adding polymer Pl. In this case, the use of very high molecular weight polymer Pl is recommended.

The dye affinity and cementability of the material is also be improved by polymer Pl. The processing temperature of POM can be lowered by the addition of polymer Pl, by which additional processing reliability is achieved. Furthermore, the polymer blends are distinguished by improved surface gloss.

Other features of the invention will become apparent according to the following descriptions of the exemplary embodiments which are given for illustration of the invention and are not intended to be limiting thereof. In the following examples, the viscosity J was determined by IZOD 1628-6 or by DIN 7745-II, Section 3.

EXAMPLES

Examples 1-6: Preparation of compatible polymer blends

Polyoxymethylene (DELRIN 500 F ®; product of DuPont) was mixed in the following weight ratios with polymethyl acrylate (J=60 ml/g) in a Brabender ® measuring kneader.

TABLE 1

| Example | POM Polymethyl acrylate |
|---------|------------------------|
| 1 | 98:2 |
| 2 | 80:20 |
| 3 | 67:33 |
| 4 | 50:50 |
| 5 | 33:67 |
| 6 | 20:80 |

In all cases, a glass-clear melt was obtained that was readily processable and that solidified upon cooling to a crystalline material with good surface gloss.

Example 7

40 g of POM (DELRIN 500 F ®) was mixed with 10 g of a copolymer comprising 90 parts by weight ethyl acrylate and 10 parts by weight decyl methacrylate in a Brabender ® measuring kneader.

A glass-clear melt was obtained at 180° C., which solidified to a product with good gloss.

Examples 8-10

40 g of POM (DELRIN 500 F ®) was mixed with the following parts by weight of a copolymer of 90 wt. % ethyl acrylate and 10 wt. % 2-ethylhexyl methacrylate in a measuring kneader.

TABLE 2

| Example | POM | Polymethyl acrylate |
| --- | --- | --- |
| 8 | 40 g | 2 g |
| 9 | 40 g | 6 g |
| 10 | 40 g | 20 g |

A glass-clear melt was obtained at 185° C., which solidified to a glossy product.

Synthesis of the polymers P1 for the mixtures in Examples 7-10:

Polymer P1 for Example 7

350 g of toluene, 135 g of ethyl acrylate, and 15 g of n-decyl methacrylate were polymerized with stirring in a reaction flask at 50°-60° C. under argon with 0.3 g of dodecyl mercaptan as a regulator and 2 g of t-butyl perneodecanoate as initiator. After about 30 minutes of reaction, the mixture was precipitated in methanol and the polymer was dried under vacuum.

Polymers P1 for Examples 8-10

The method described for Example 7 was used, but with a different monomer composition, i.e., 135 g of ethyl acrylate and 15 g of 2-ethylhexy methacrylate.

Example 11

40 g of POM (DELRIN 500 F ®) was mixed with 10 g of a copolymer of 93 wt. % methyl acrylate and 7 wt. % styrene to form a glass-clear melt.

Example 12 (Comparison test)

40 g of POM (DELRIN 500 F ®) was mixed with 6 g of a polymethyl methacrylate (PLEXIGLAS Y8N ® of Rohm GmbH; J=50 ml/g). A cloudy, incompatible melt was obtained.

Example 13

90 wt. % polyoxymethylene (DELRIN 900 F ®) was mixed with 10% polymethyl acrylate (J=143 ml/g). The polymer blend prepared from this mixture can be processed distinctly more readily than polyoxymethylene itself. Thus, polyoxymethylene alone at 178° C. shows a melt viscosity of 1,940 Pa.s (1 N/cm$^2$), while on the other hand, it has a melt viscosity at 180° C. of only 535 Pa.s (1 N/cm$^2$).

By contrast, the melt viscosity of the compatible polymer blend in this temperature range is distinctly less temperature-dependent. Thus, the mixture has the following melt viscosities:
530 Pa.s at 178° C.,
505 Pa.s at 180° C.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A compatible polymer blend consisting essentially of:
    a) 0.5-99.5 wt. % of homopolymer or copolymer polyoxymethylene component, and
    b) 99.5-0.5 wt. % of a homopolymer of methyl acrylate or ethyl acrylate,
    wherein said blend is glass-clear in the melt.

2. The compatible polymer blend of claim 1, wherein said homopolymer is polymethylacrylate.

3. The compatible polymer blend of claim 1, wherein said homopolymer is polyethylacrylate.

4. The compatible polymer blend of claim 1, comprising 60-99.5 wt. % of said polyoxymethylene component and 40-0.5 wt. % of said homopolymer component.

5. The compatible polymer blend of claim 4, comprising 80-99 wt. % of said polyoxymethylene component and 20-1 wt. % of said homopolymer component.

6. The compatible polymer blend of claim 1, wherein said polyoxymethylene component is a homopolymer of polyoxymethylene.

7. The compatible polymer blend of claim 1, wherein said polyoxymethylene component has a number average molecular weight in the range of 20,000-100,000.

8. The compatible polymer blend of claim 1, wherein said homopolymer component has a molecular weight in the range of 2,000-5,000,000.

9. The compatible ,polymer blend of claim 8, wherein said homopolymer component has a molecular weight in the range of 20,000-3,000,000.

10. The compatible polymer blend of claim 1, wherein said polyoxymethylene homopolymer or copolymer is in a stabilized form.

11. The compatible polymer blend of claim 10, wherein said polyoxymethylene homopolymer or copolymer is stabilized by an acylation or etherification reaction of terminal hemiacetal OH groups.

12. The compatible polymer blend of claim 11, wherein said terminal hemiacetal OH groups are reacted with an acid anhydride or epoxide to form said stabilized homopolymer or copolymer.

* * * * *